US008862992B2

(12) United States Patent
Frey

(10) Patent No.: US 8,862,992 B2
(45) Date of Patent: Oct. 14, 2014

(54) METHOD AND SYSTEM FOR GUIDING USER SELECTION OF A REPLACEMENT WATERCRAFT PROPELLER

(75) Inventor: Jason Frey, Palatine, IL (US)

(73) Assignee: Turning Point Propellers, Inc., Jacksonville, FL (US)

( * ) Notice: Subject to any disclaimer, the term of this patent is extended or adjusted under 35 U.S.C. 154(b) by 285 days.

(21) Appl. No.: 12/938,012

(22) Filed: Nov. 2, 2010

(65) Prior Publication Data

US 2012/0110449 A1    May 3, 2012

(51) Int. Cl.
*G06F 3/00* (2006.01)
*G06F 3/048* (2013.01)
*G06Q 30/06* (2012.01)

(52) U.S. Cl.
CPC ........ *G06Q 30/0621* (2013.01); *G06Q 30/0603* (2013.01)
USPC ............ 715/708; 715/705; 715/712; 715/713

(58) Field of Classification Search
CPC .................................. G06F 17/00; G06F 3/00
See application file for complete search history.

(56) References Cited

U.S. PATENT DOCUMENTS

| | | | | |
|---|---|---|---|---|
| 5,442,759 | A * | 8/1995 | Chiang et al. ................. | 705/326 |
| 5,890,905 | A * | 4/1999 | Bergman ....................... | 434/118 |
| 6,340,977 | B1 * | 1/2002 | Lui et al. ....................... | 715/709 |
| 8,230,466 | B2 * | 7/2012 | Cockrell et al. ................ | 725/81 |
| 2006/0259861 | A1 * | 11/2006 | Watson ........................... | 715/705 |
| 2008/0008456 | A1 * | 1/2008 | Buttars et al. .................. | 386/125 |
| 2008/0231595 | A1 * | 9/2008 | Krantz et al. ................... | 345/156 |
| 2009/0024923 | A1 * | 1/2009 | Hartwig et al. ................ | 715/716 |
| 2011/0161182 | A1 * | 6/2011 | Racco ........................... | 705/14.73 |
| 2011/0246880 | A1 * | 10/2011 | Horton et al. .................. | 715/708 |
| 2011/0276401 | A1 * | 11/2011 | Knowles et al. ............ | 705/14.58 |
| 2012/0042250 | A1 * | 2/2012 | Hartwig et al. ................ | 715/719 |
| 2012/0110449 | A1 * | 5/2012 | Frey ............................... | 715/708 |

OTHER PUBLICATIONS

Turning Point Propellers (http://turningpointpropellers.com, Mar. 6, 2008).*
Screen Shots from Turning Point Propellers Website, http://turningpointpropllers.com, initially published Mar. 6, 2008.

* cited by examiner

*Primary Examiner* — Matt Kim
*Assistant Examiner* — Mahelet Shiberou
(74) *Attorney, Agent, or Firm* — Boyle Fredrickson, S.C.

(57) ABSTRACT

A computer implemented system automatically launches a video to assist a computer user in navigating through a set of menus on a graphical user interface (GUI) without separately requiring the computer user to select a link to a video file or launch a software program designed to playback the video. The system executes a two-phase process for assisting the computer user in determining a replacement part for an OEM part. In the first phase, the system selectively presents a series of menus to the computer user to allow the computer user to identify the OEM part. A video is automatically played during the first phase of the process to assist the user in completing the first series of menus. After the computer user has completed the first menus, the system launches a second set of menus and begins playing a video to assist the computer user in determining options for the replacement part.

13 Claims, 11 Drawing Sheets

METHOD AND SYSTEM FOR GUIDING USER SELECTION OF A REPLACEMENT WATERCRAFT PROPELLER

FIELD OF THE INVENTION

This invention relates generally to watercraft propellers, and in particular, to a method and a system for guiding the user selection of a replacement watercraft propeller.

BACKGROUND OF THE INVENTION

Selection of a replacement propeller for a watercraft can be a daunting task, even for experienced watercraft owners. The replacement propeller must be matched to the engine for the watercraft and be capable of providing the performance desired by the watercraft operator. For example, in choosing a replacement propeller, in addition to matching to the watercraft's engine, considerations must be given to the material makeup of the propeller, e.g., aluminum or stainless steel, the pitch and diameter of the propeller, the propeller's rake, and the degree of propeller cupping. Each of these factors can impact propeller performance and, as a result, many watercraft operators can become frustrated in selecting an appropriate replacement propeller. In many instances, these frustrations can be assuaged by meeting personally with a sales representative who walks the watercraft owner through the various propeller options. However, when choosing a replacement propeller when visiting a manufacturer's or retailer's website, it is generally not possible for the watercraft operator to consult with a sales representative who can guide the operator through the myriad of replacement propeller options that may be available.

Accordingly, some manufactures and online retailers, or storefront retailers that enable online purchases, have websites equipped with interfacing tools to guide a potential purchaser in selecting a replacement propeller. One such manufacture is Turning Point Propellers of Elk Grove Village, Ill. whose website includes an interactive tool that identifies matched replacement propellers based on a series of user inputs, such as engine manufacturer, engine horsepower, engine model, model year, boat category, boat length, boat year, boat manufacturer, and boat model. Despite the intuitiveness provided by such interactive tools, it is not uncommon for a user to have difficulty navigating through the various menus and understanding what selections need to be made to pinpoint a replacement propeller.

One proposed solution has been the inclusion of video that guides the user through the menus and provides advice and/or suggestions for making the selections. The inclusion of video can be problematic however. More particularly, most websites are designed such that a user must select a hyperlink to a video. Selection of the hyperlink will typically cause a new window to popup and play the video or will launch a media player resident on the computer being used to access the website. In the case of the former, if the user has a popup blocker enabled, the new window may not load thereby preventing viewing of the video. In the case of the latter, the media player will load over the website resulting in the video player blocking the website. When the user "clicks" on any part of the website to as to view it, the website will become superimposed over the video player. As a result, it is difficult for the user to interface with the website's interactive tool without hiding the video player.

SUMMARY OF THE INVENTION

The present invention is directed to a computer-implemented method and system for guiding a user in selecting a replacement propeller for a watercraft. The invention includes an interactive tool (graphical user interface) that is available on a website and includes a series of menus that enable a user to identify various characteristics for the watercraft, such as the engine, to determine a list of replacement propellers usable with the watercraft. The graphical user interface (GUI) has a video portion and a menu portion. The series of menus are displayed in the menu portion and a video is streamed automatically in the video portion. The content of the video can vary, but in one preferred embodiment, the video guides the user through the set of menus. The video streams automatically with user access to the GUI and thus does so without launching a separate software program or causing a separate website, window, or GUI to be launched. After the user has input values for one or more parameters associated with the watercraft, such as the engine, the GUI enables a second set of menus that were previously disabled. The second set of menus allows the user to select options for the replacement propeller, such as material, number of blades, and rotation direction. In addition, a video to guide the user through the second set of menus is automatically played on the GUI when the second set of menus is enabled.

Therefore, in accordance with one aspect of the invention, a computer-implemented process for guiding a consumer in selecting a replacement part for an OEM part is provided. The computer-implemented process includes causing a graphical user interface (GUI) to be displayed on a remote display unit, wherein the GUI includes a video display portion and first and second menu portions. The first menu portion is configured to allow a user to select values for one or more properties associated with the OEM product and the second menu portion is configured to allow the user to select options for the replacement part for the OEM product. The process further includes disabling the second menu portion and transmitting data to the remote display unit. The transmitted data includes video content that is automatically played on the GUI in the video display portion when the GUI is displayed on the remote display unit, and wherein the video content includes media for guiding a user in completing the first menu portion.

In accordance with another aspect of the invention, a computer implemented system for guiding user selection of a replacement part for an OEM part includes a database containing a listing of replacement parts. The system further has memory storing a first video file and a second video file. The first video file contains video content for guiding user identification of a machine having an OEM part a user desires to replace and the second video file contains video content for guiding user selection of a replacement part for the OEM part. A computer is communicatively linked with a remote display unit and instructed by computer executable code to display a graphical user interface (GUI) on the display unit. The GUI has a first set of menus and a second set of menus, and the computer is further caused to selectively enable in a prearranged order the first set of menus and play the video content of the first video file on the GUI upon display of the first set of menus on the GUI. The computer is further caused to enable the second set of menus to facilitate user interaction therewith upon user completion of the first set of menus and automatically play the video content of the second video file on the GUI upon user completion of the first set of menus.

According to another aspect of the invention, a computer-implemented system for guiding user selection of an aftermarket propeller for a watercraft is provided. The system has a database containing a listing of watercraft engine manufactures, power output options for engines manufactured by the watercraft engine manufactures, engine models for the watercraft engine manufactures, and model years for engines manufactured by the watercraft engine manufactures. The system further has memory storing a first video file and a second video file, with the first video file containing video content for guiding user identification of a watercraft engine and the second video file containing video content for guiding user selection of a replacement propeller for use with the watercraft engine. A computer is communicatively linked with a remote display unit and instructed by computer executable code to display a graphical user interface (GUI) on the display unit. The GUI has a video portion and a menu portion, and is caused to display a first set of menus in the menu portion prompting a user to make inputs on the GUI to enter a watercraft engine manufacture, a power output for the watercraft engine, an engine model of the watercraft engine, and a model year for the watercraft engine and is further caused to play the first video file in the video portion to guide user completion of the first set of menus. The computer is further caused to determine a replacement propeller for use with the watercraft engine from the user inputs to the first set of menus and to display a second set of menus in the menu portion prompting the user to make inputs on the GUI to select desired options for the replacement propeller. The computer is also caused to play the second video file in the video portion to guide user completion of the second set of menus.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION

Figure 1:
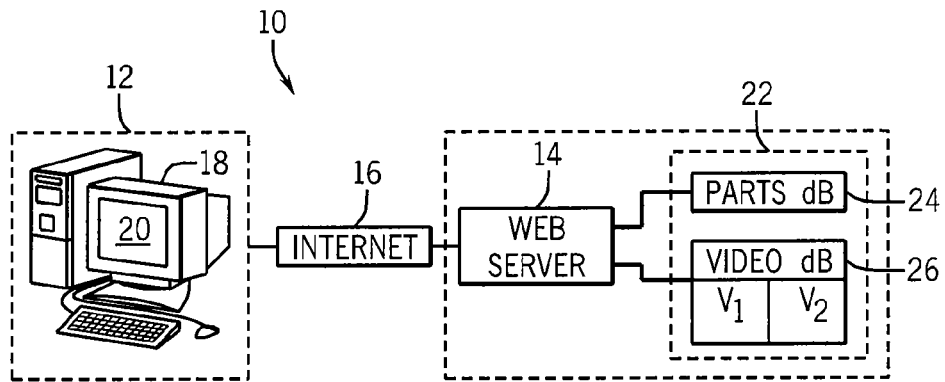
FIG. 1 is a block diagram illustrating a computer-implemented online system for enabling a remote computer user to determine a replacement part for an OEM part and to view an instructional video while making such a determination without having to load a separate media player or user interface to play the instructional video.

Referring now to FIG. 1, an online system 10 for enabling a remote computer to determine a replacement part for an OEM part generally consists of a remote user workstation 12, which may be any known or to-be-developed computing device such as, but not limited to, a desktop computer, a notebook or laptop computer, a personal data assistant, a cellular phone, and the like, a web server 14, and a communications network 16 that allows data to be transmitted between the remote user workstation and the web server. The communications network 16 may, for example, comprise one or more of the Internet or other globally and publicly accessible computing networks, a local or wide area dedicated or private network, wireless network, dial-up services, etc.

The remote user workstation 12, as known in the art, includes hardware and software to link with the web server 14, request data contained on the web server 14 be transmitted thereto, and then display the data on a display unit 18 as a webpage 20. Similarly, the web server 14 includes hardware and software to link with the remote user workstation, receive a request for data ("webpage"), locate the data in memory 22, and transmit the data to the remote user workstation 12 in a manner that allows a browser, for example, stored on the computer workstation 12 to process the data and display the data as webpage 20. In addition to the display unit 18, the computer workstation 12 has various I/O devices, e.g., mouse and keyboard, to enable user interaction with the webpage.

Memory 22 includes at least two types of data to facilitate user selection of a replacement part for an OEM part. The memory 22 includes a parts database 24 and a video database 26. The parts database 24 contains a listing of each replacement propeller available together with data providing various attributes for each available replacement propeller, as will be described. The video database 26 includes video files having audio/video content, as will be described. It is understood that memory 22 and the associated databases may be resident on the web server 14 itself or may be accessed by the web server 14 from remote memory in a conventional manner. The web server also 14 includes a microprocessor (not shown) capable of executing program logic to parse through the data contained in the parts database 24 to identify one or more replacement parts based on a set of inputs provided by the computer user, as discussed below.

Whether accessed directly by entering a dedicated "web address" or accessed through interaction with a webpage, the web server 14 includes data that when processed by the browser on the remote workstation 14 causes an interactive tool 28 to be launched and displayed on the display unit 18 as a graphical user interface (GUI) 30. As will be described with respect to FIGS. 2 through 18, the GUI 30 presents a series of menus in a prearranged order to the computer user to guide the user in identifying one or more replacement propellers. Furthermore, the GUI automatically launches a video stored on the video database 26 when the interactive tool is launched. In this regard, the computer user does not need to mouse-click on a hyperlink or launch a separate media playback program to view the video. In one embodiment, the content of the video is designed to guide the computer user through the various menus that the computer user will be instructed to complete to identify the one or more replacement propellers.

Figure 2:
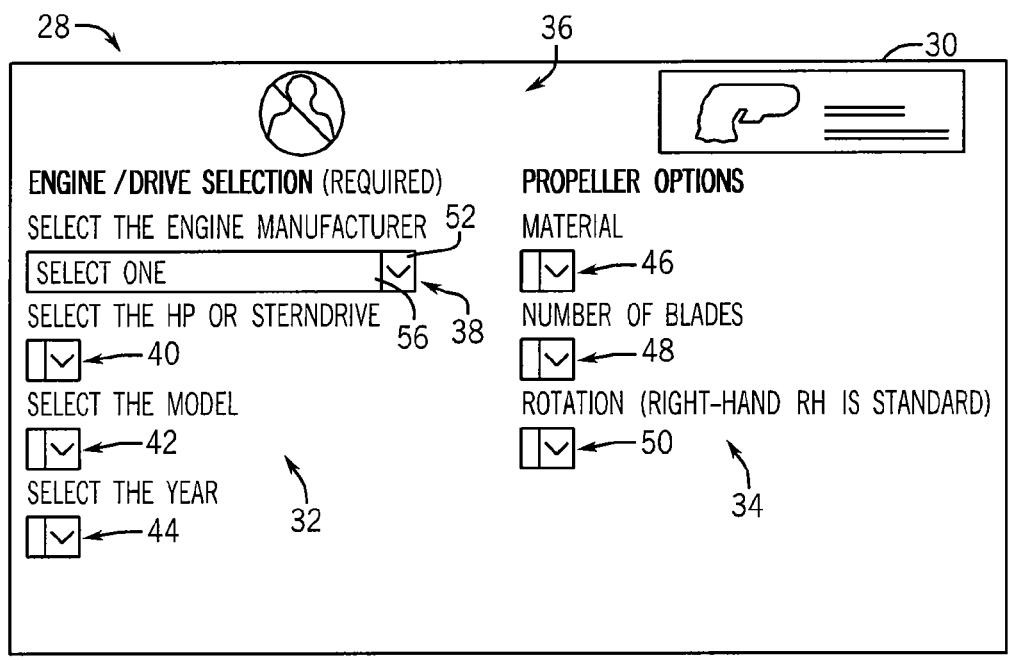
FIGS. 2 through 18 illustrate a graphical user interface (GUI) that may be displayed on a remote computer to facilitate a computer user in determining a replacement part for an OEM part and view an instructional video while making such a determination.

Turning now to FIG. 2, the GUI 30 generally consists of three different visual components or portions—a first menu portion 32, a second menu portion 34, and a video portion 36. It is understood however that the GUI 30 may include additional components than those described herein. Moreover, it is further contemplated that the menu portions 32, 34 could be combined into a single menu portion. As noted above, video is played in the video portion 36. Thus, in a preferred embodiment, the remote workstation 12 has a resident add-on ("plug-in") type video player that allows video to be displayed on the GUI 30 within the video portion 36. In an alternate embodiment, a separate media player program may be launched. Accordingly, the video is in a conventional file format that is recognizable by most known or to-be-developed plug-in type media players, e.g., a "wav" file.

Figure 19:
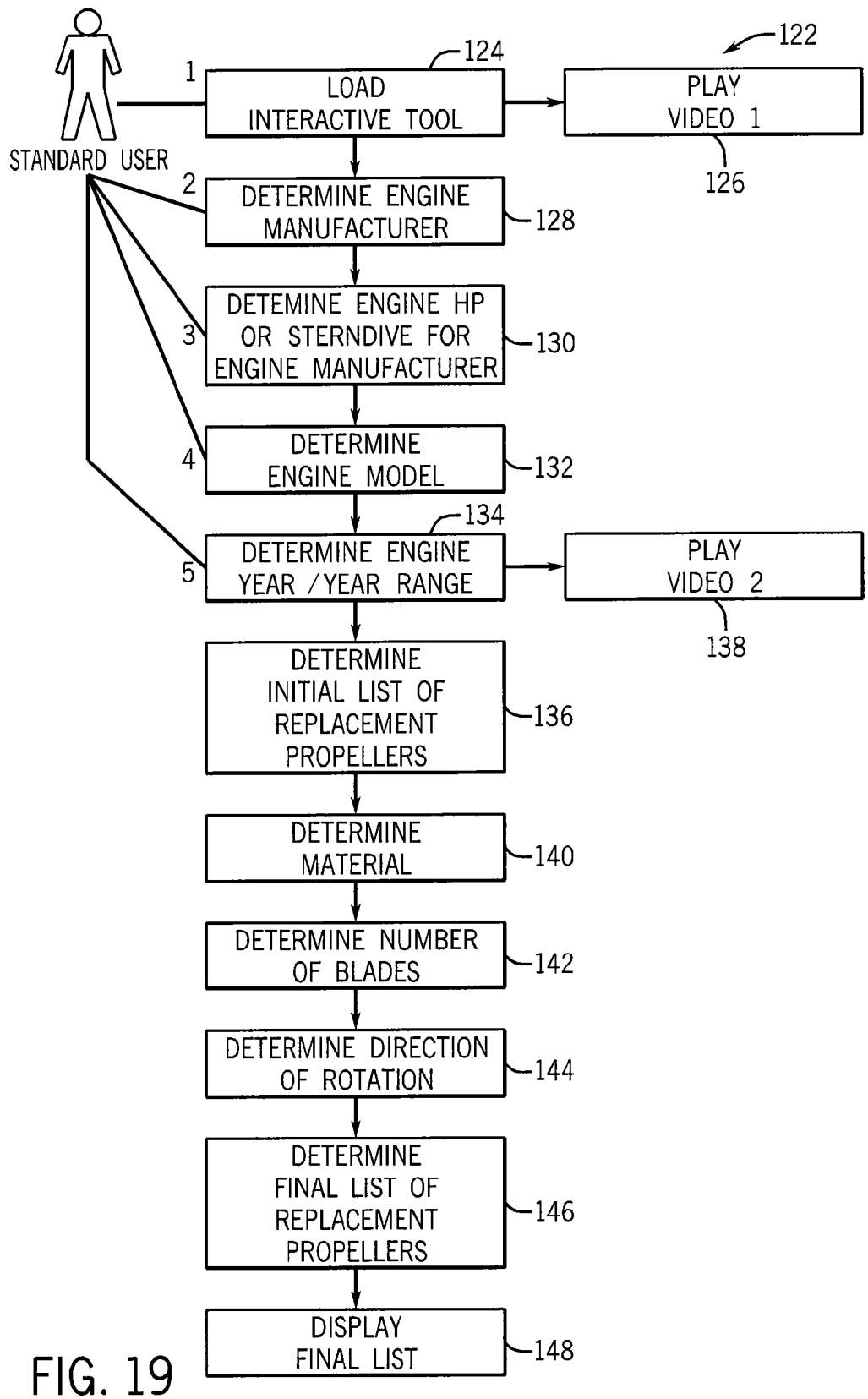
FIG. 19 is a flow chart setting forth the steps of a computer-implemented process for determining a replacement part for an OEM part.

The first menu portion 32 consists of a series of "drop down" type menus that are designed to guide the computer user through the first phase of a process of determining a replacement propeller. The steps of the process are shown in FIG. 19. The second menu portion guides the computer user through a second phase of the process and is dependent on the inputs the computer user has made in the first menu portion.

In one preferred embodiment, the first menu portion 32 enables the computer user to input data characterizing the engine/drive for which the replacement propeller will be used. In this regard, the first menu portion 32 includes various menus that enable the computer user to input various predefined characteristics for the engine/drive, such as an "engine manufacturer" menu 38, a "HP or sterndrive" menu 40, a "model" menu 42, and a "year" menu 44. The second menu portion includes a "material" menu 46, a "number of blades" menu 48, and "rotation" menu 50. As will become apparent from the following description, each menu includes a drop down selector for selecting a list of options for the selected menu option and a menu field that becomes populated with a user selection for the particular menu option.

Figure 3:
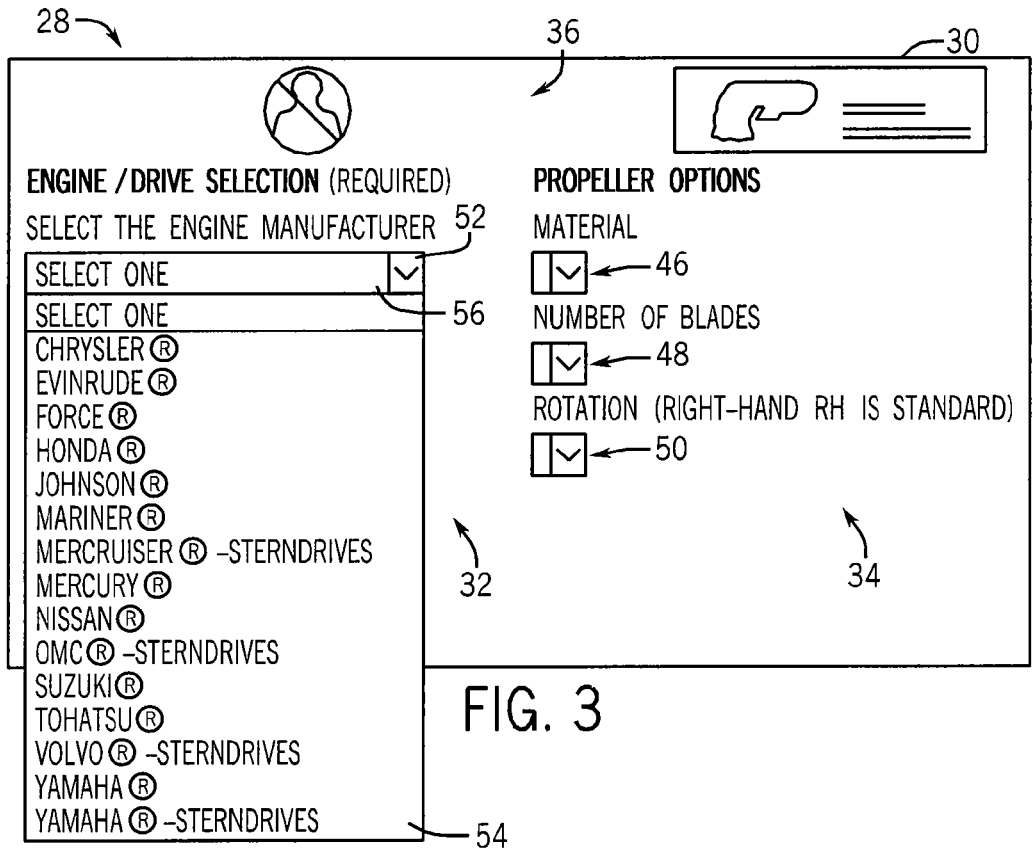

In one preferred embodiment, when the interactive tool 28 is first launched, menu 38 is enabled but menus 40, 42, 44, 46, 48, and 50 are disabled. Thus, when the computer user accesses the interactive tool 28, the first selection the computer user must make in determining a suitable replacement propeller is the manufacture of the engine or drive. To facilitate this selection, menu 38 is preferably a drop down menu such that when the computer user selects the menu by selecting drop down arrow 52, a list of engine and sterndrive manufactures 54 appears below menu field 56, as illustrated in FIG. 3. As noted above, menu 38 initially is the only available menu. In this regard, in the illustrated embodiment, engine and sterndrive manufacturer is a top-level delineator for the list of replacement propellers listed on parts database 24.

Figure 4:
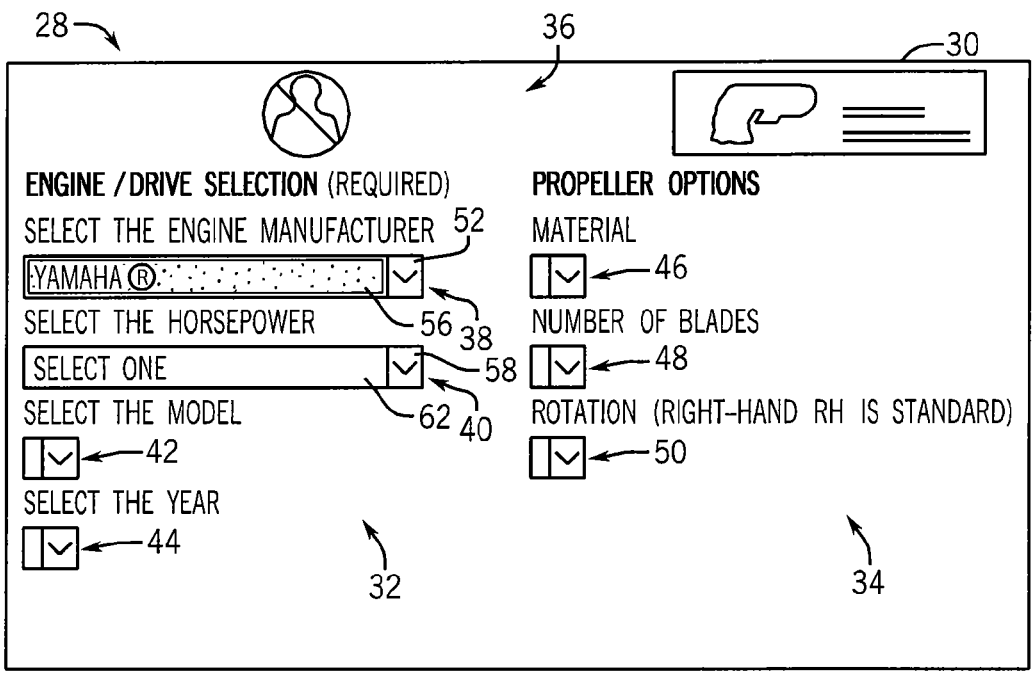
Figure 5:
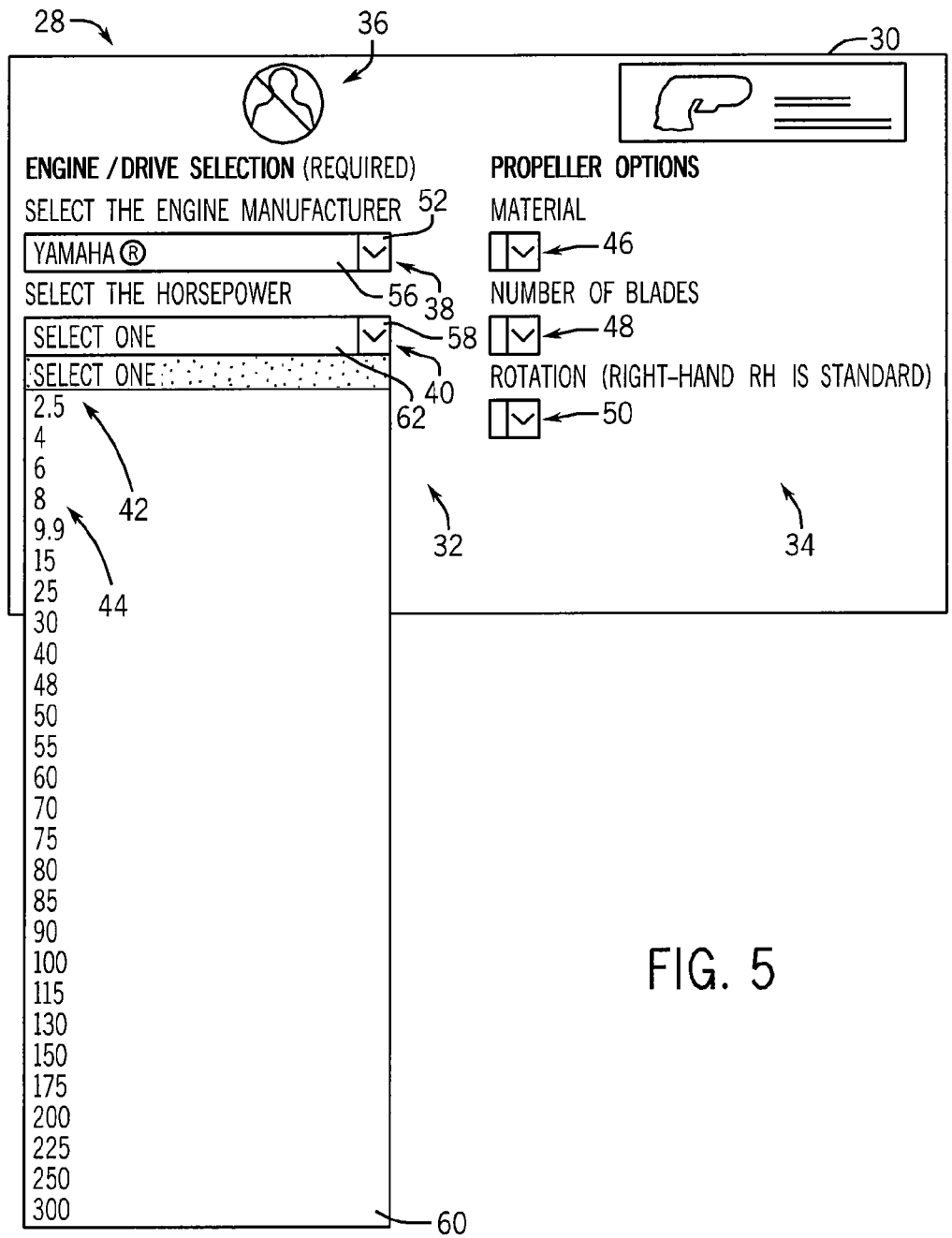

Once the computer user has selected the engine or sterndrive manufacture from the manufactures listed in menu 38, the menu field 56 is populated with the user selection and menu 40 is then enabled, as shown in FIG. 4. The results of user selection of a sterndrive manufacturer in the listing shown in menu 38 will be described with respect to FIGS. 15 through 18. As referenced above, the web server 14 includes a processor and logic to parse through the database based on user inputs. Thus, in response to the user input identifying the engine manufacturer and selecting drop down arrow 58, a list of horsepower options 60 for engines of the selected engine manufacturer are displayed below menu field 62, as shown in FIG. 5.

Figure 6:
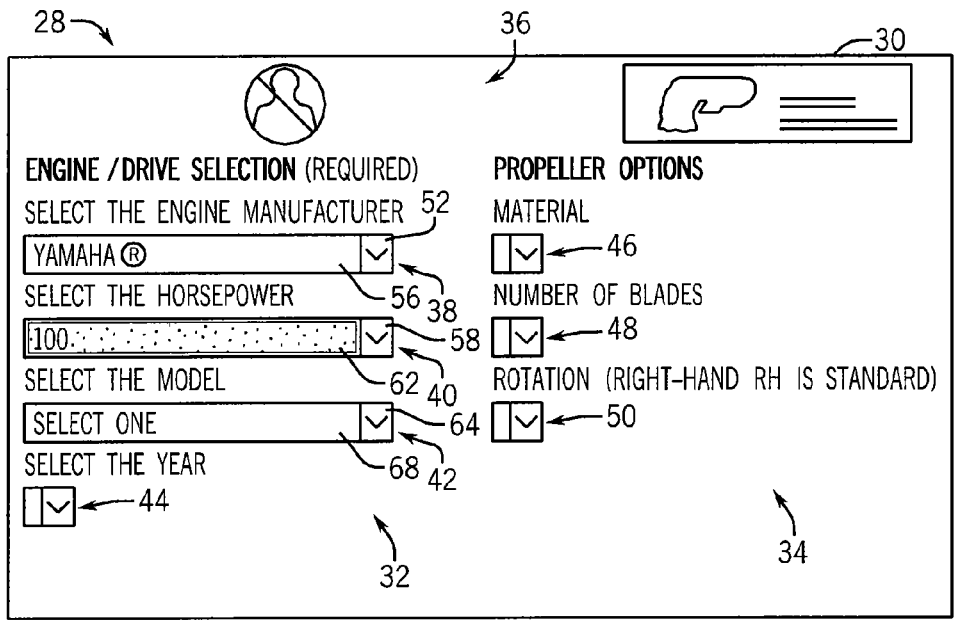
Figure 7:
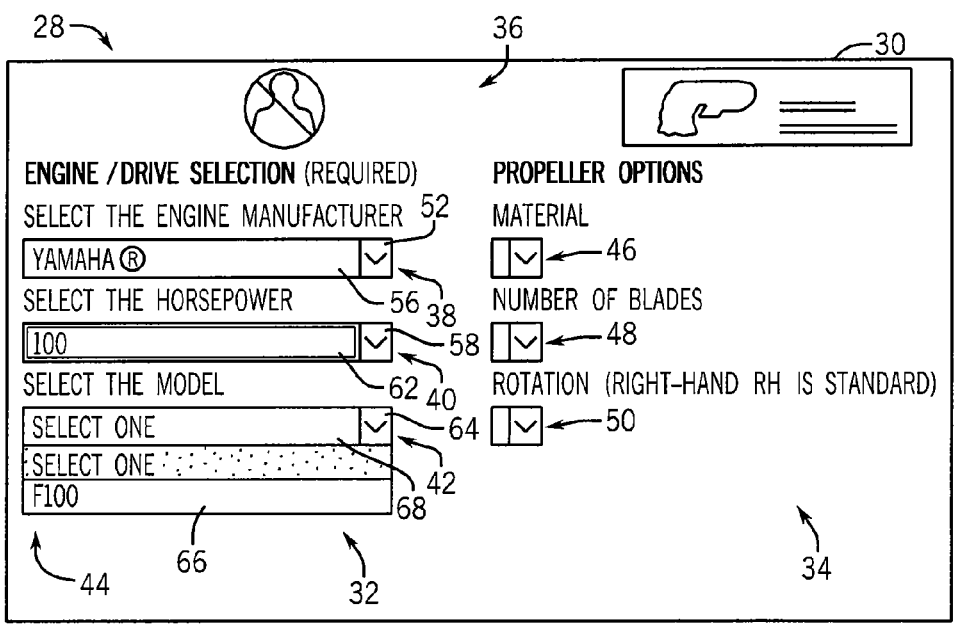
Figure 8:
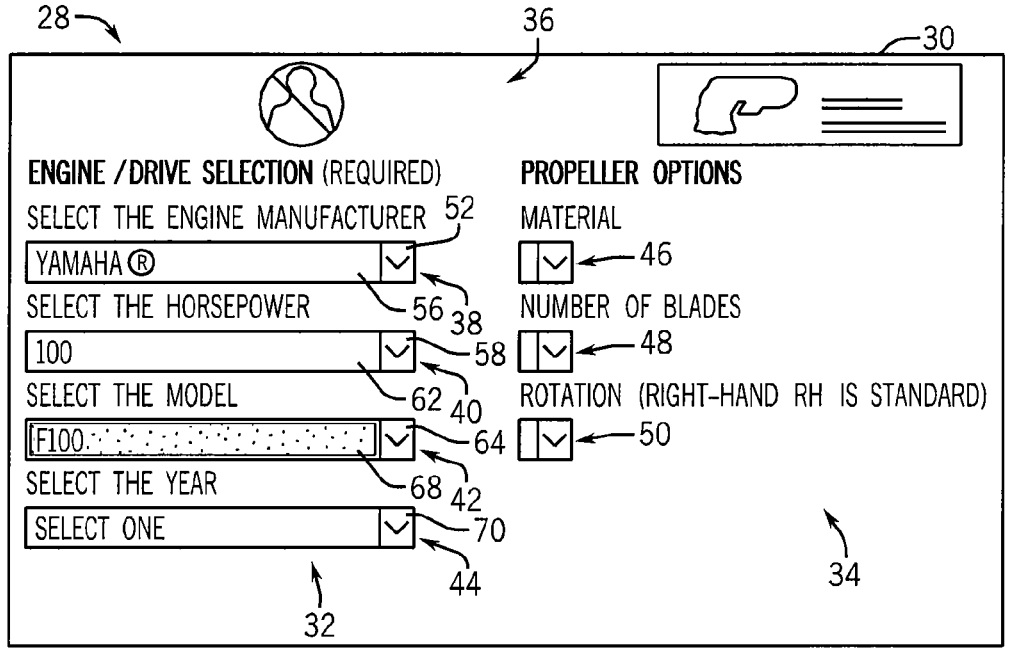
Figure 9:
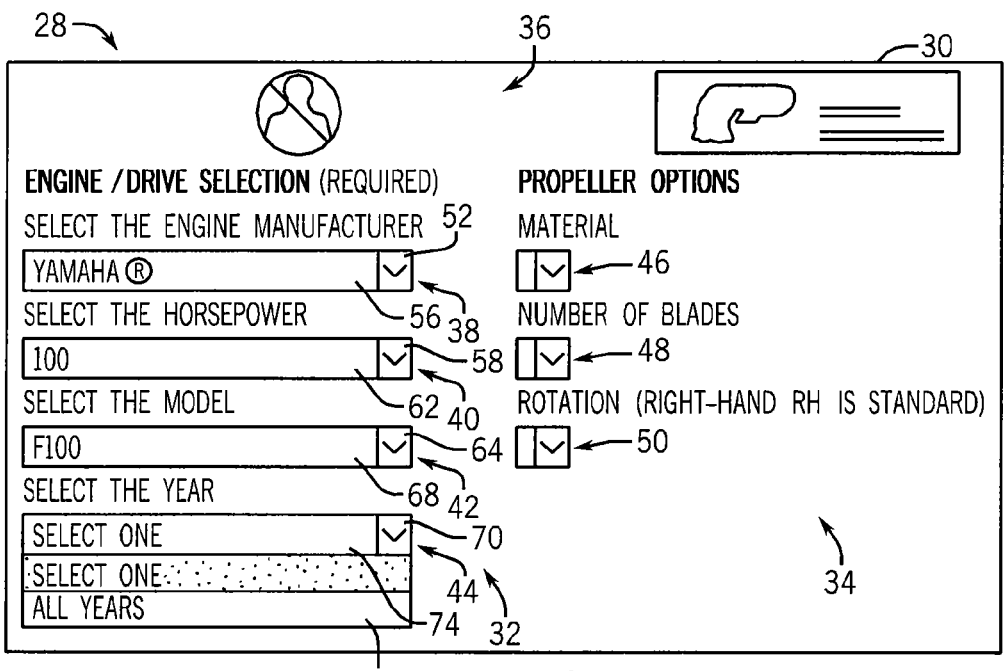
Figure 10:
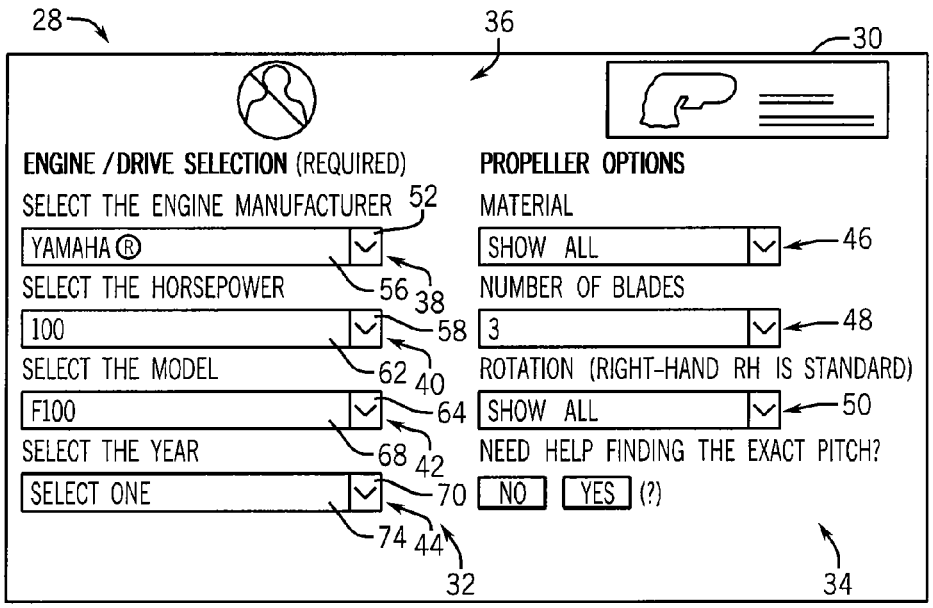

The computer user may then select one of the listed horsepower options using a standard input, e.g., "mouse click", which results in the selected option being populated in the menu field 62 as shown in FIG. 6. As also shown in FIG. 6, when the horsepower value has been selected, the "model" menu 42 is enabled. The computer user may then select menu 42 by selecting drop down arrow 64 to display a list 66 of model options below menu field 68, as shown in FIG. 7. User selection of a listed model will cause the selected model to be listed in menu field 68 and will also enable the "year" menu 44 as shown in FIG. 8. As shown in FIG. 9, user selection of drop down arrow 70 will display a list 72 of available years below field 74 for the selected model. In the illustrated example, the only option is an "all years" option which indicates the possible replacement propellers for the selected engine manufacturer, selected horsepower, and selected model will apply for all model years of the engine. User selection of a model year value will then result in that user selection populating the menu field 74 as shown in FIG. 10.

As noted above, the menus of the second menu portion 34 are disabled until the computer has made a selection for each of the menus of the first menu portion. During this first phase of the process, a video is played in the video portion 36 to walk the computer user through completing the first phase of the process. The video is played automatically and thus does not require the computer user to select a hyperlink or otherwise open a new file or launch the media player of a separate software application. Moreover, the video plays as the computer user makes selections during the first phase of the process without restarting. Thus, in one preferred embodiment, the video plays uninterrupted as the user completes the first set of menus. It is contemplated that the video portion may include playback controls, such as pause, play, stop, and the like, to give the computer user some control in the manner in which the video content is played in the video portion 36 of the GUI 30.

After the computer user has made a selection for each of the menus of the first menu portion 32, the menus of the second menu portion are enabled and a video for guiding user completion of the second phase of the process automatically begins to play in the video portion 36. In contrast to the selective enablement of the first phase menus 38, 40, 42, and 44, in one embodiment, all of the second phase menus 46, 48, and 50 are enabled at once with completion of the first phase of the process. Also, depending on the user selections during the first phase of the process, the options for one or more of the menus 46, 48, 50 may be auto-selected, as shown for the "number of blades" menu 48 in FIG. 10. For the exemplary user selections for menus 38, 40, 42, and 44, each of the possible replacement propellers has three (3) blades and thus the field for menu 48 is automatically populated with the number "3."

Figure 11:
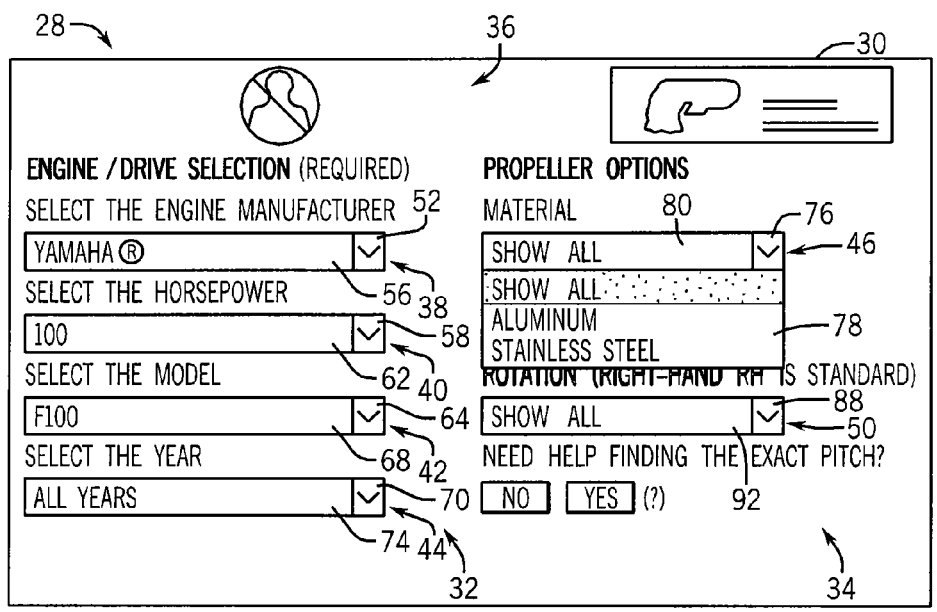
Figure 12:
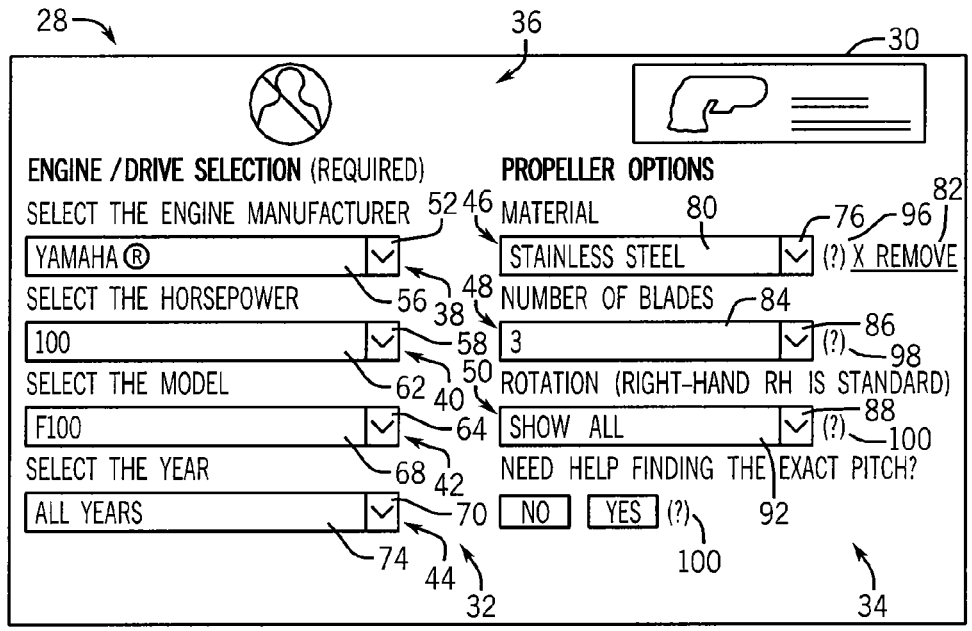

Menu 46 allows the computer user to select a material for the replacement propeller by selecting drop down arrow 76 which causes a list of available materials 78 to be displayed, as shown in FIG. 11. In one embodiment, the material options are "Aluminum" and "Stainless Steel." After the computer has made a selection, the material selection is populated in field 80 adjacent arrow 76, as shown in FIG. 12. As further shown in FIG. 12, the computer user can remove the selected option my selecting "remove" link 82. User selection of the "remove" link will replace the selected option with "Show All" as shown in FIG. 10.

In the illustrated embodiment, the field 84 for menu 48 has been automatically populated. It is understood however that for some user inputs during the first phase of the process, the user will need to make a number of blades selection. To do so, the user would select drop down arrow 86 which would cause a list of options to be displayed in a manner similar to that described above.

Figure 13:
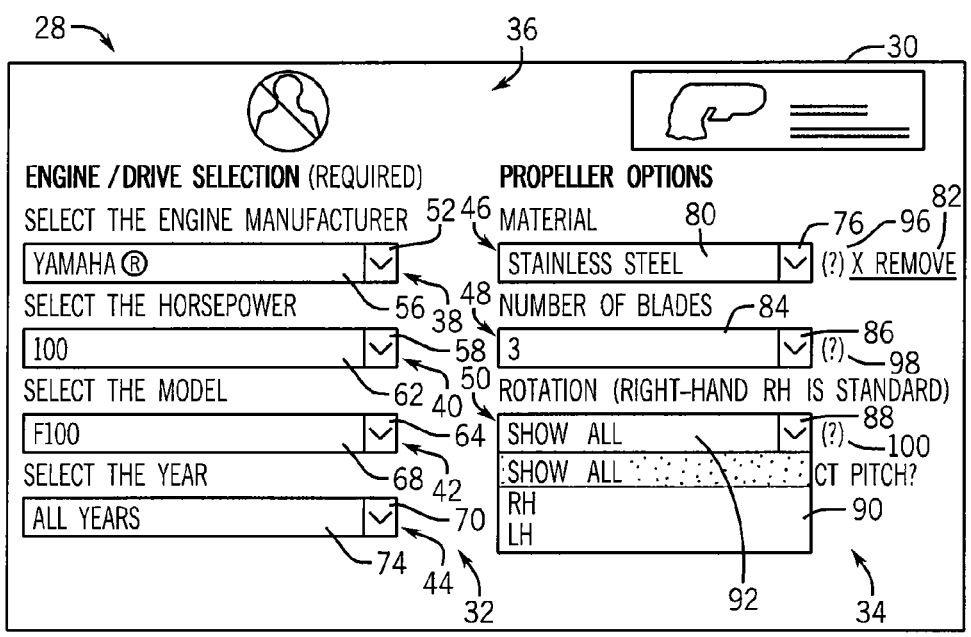
Figure 14:
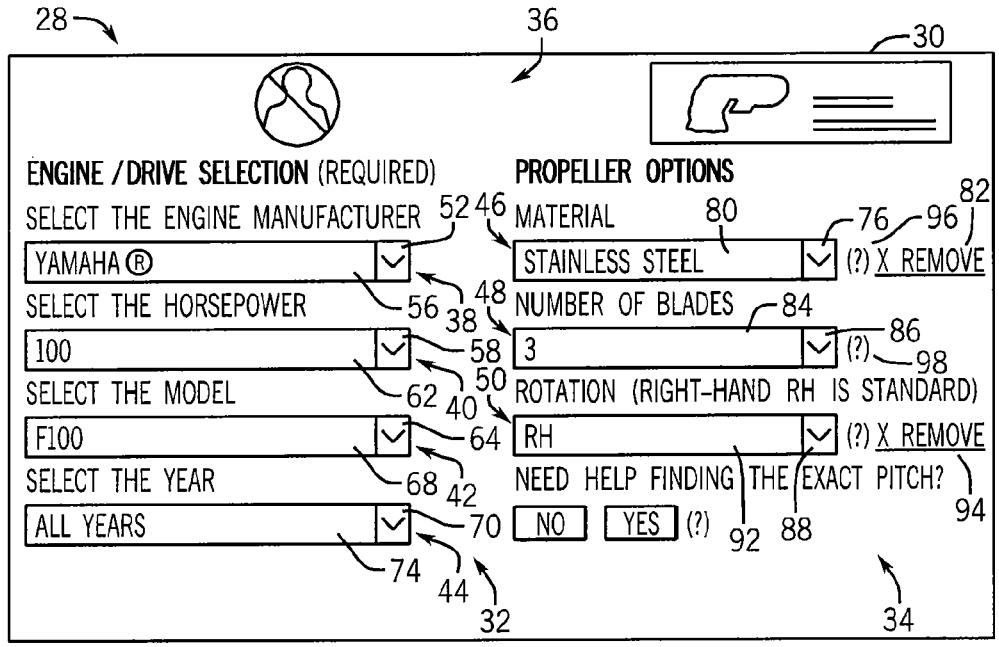
Figure 15:
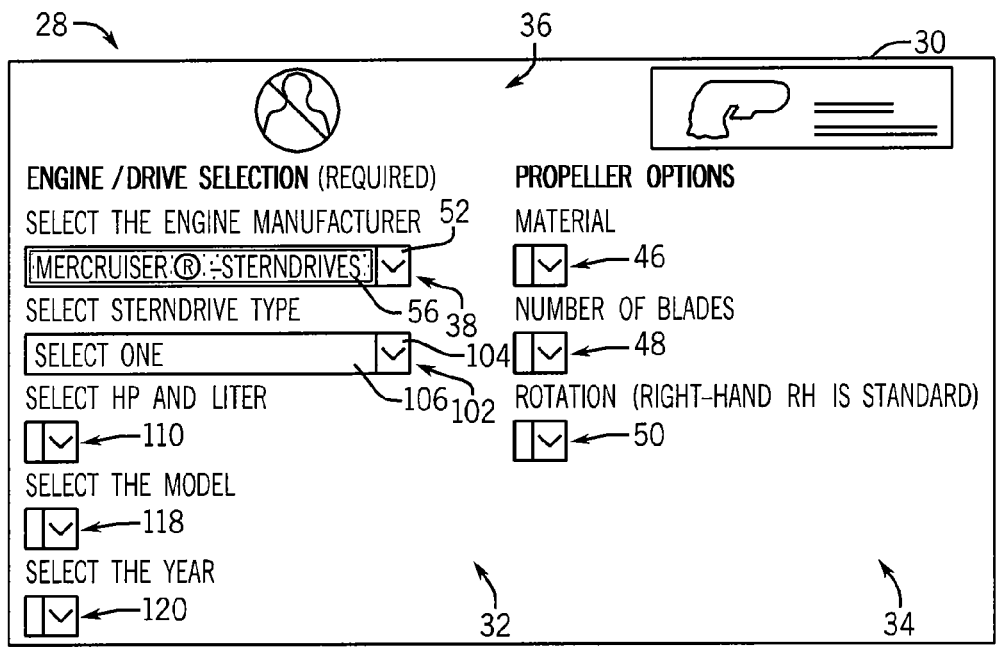

In addition to making a material and number of blades selection, the second phase of the process also requires, in most cases, for the computer user to select a direction of propeller rotation—either right-hand rotation or left-hand rotation. To make such a selection, the user selects drop down arrow 88 which causes a list of options 90 to be displayed as shown in FIG. 13. Not all replacement propellers are available as a right-hand and a left-hand option, so it is contemplated that in many instances, field 92 for menu 50 to be automatically populated.

As noted above, the computer user may select "remove" link 82 to clear the entry for field 80. In a similar manner, the computer user may select a "remove" link (not shown) for the "number of blades" menu 48 if the computer user has made a selection for the menu. In the illustrated example, the computer user was not required to make a "number of blades" selection as only one option was available. As such, a "remove" link does not appear adjacent field 84. As the computer user was required to complete menu 50, a "remove" link 94 appears adjacent drop down arrow 88 after the computer user has made a selection from list 90.

In one embodiment, there is a "help" link 96, 98, 100 for each of menus 46, 48, and 50, respectively, that appear when the second set of menus are enabled, as shown in FIG. 10. If a user selects one of the help links, a window is displayed that provides textual guidance to the computer user in making a selection for the corresponding menu.

Figure 16:
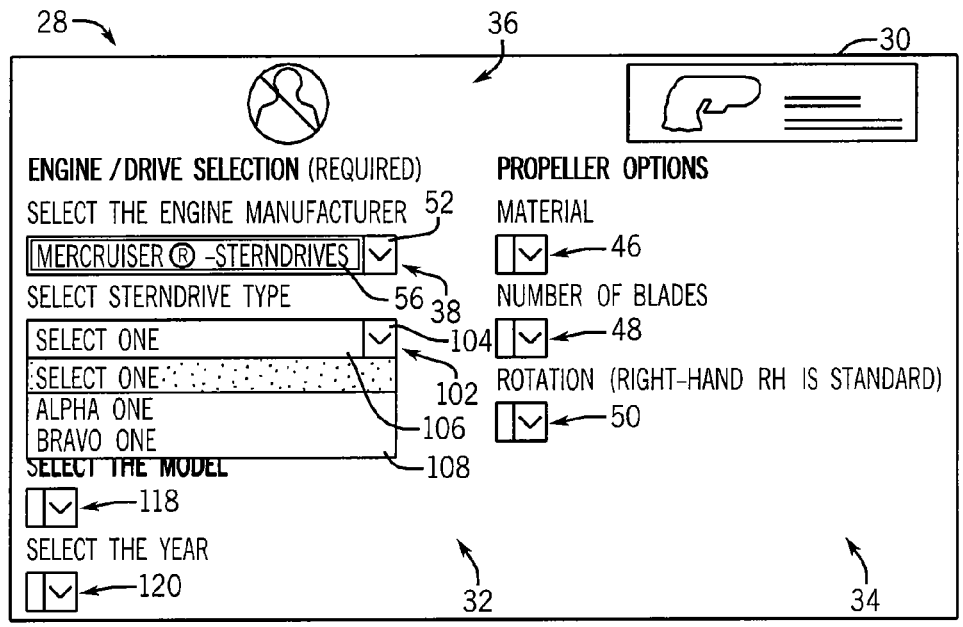
Figure 17:
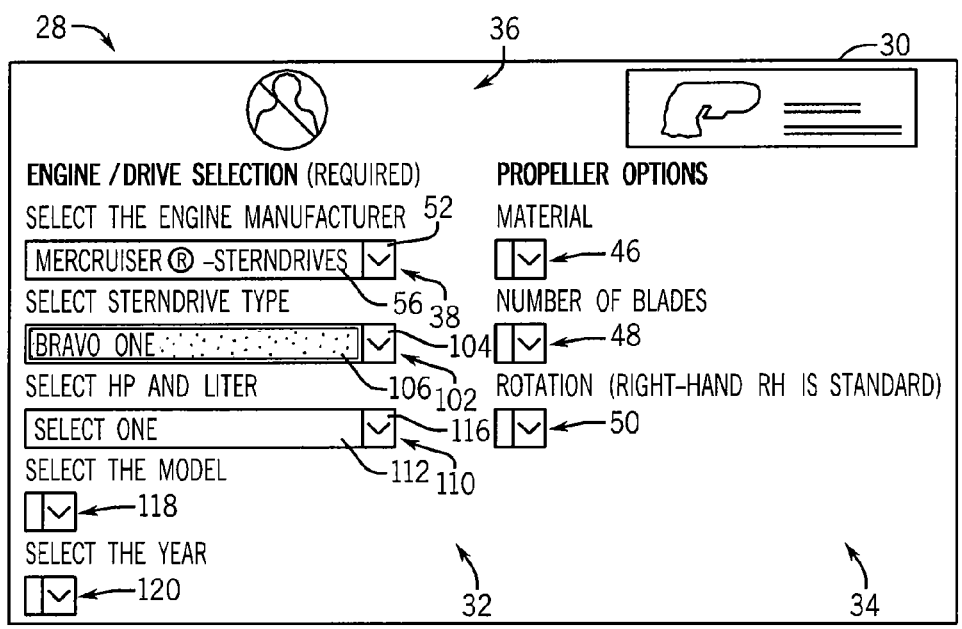
Figure 18:
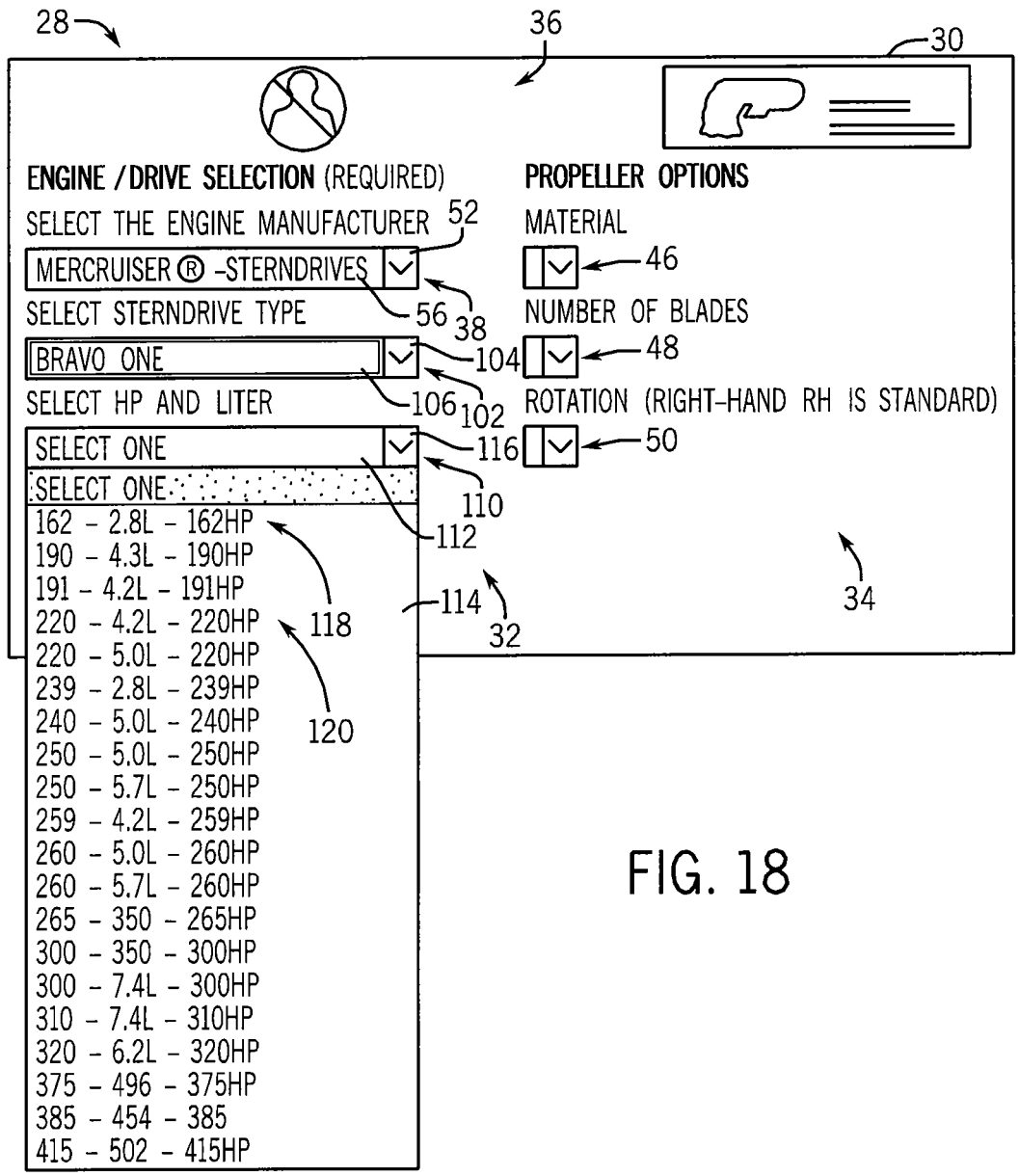

With particular reference now to FIGS. 15 through 18, if the computer user selects a sterndrive in the first phase of the process, by making a sterndrive selection from the list 54 displayed below field 56 when drop down arrow 52 is selected, FIG. 3, the interactive tool 28 prompts the computer user to select a sterndrive type via menu 102. Menu 102, similar to the other menus described herein, has a drop down arrow 104 and a select field 106 generally adjacent the arrow 104. When the computer user selects arrow 104, a list 108 of selectable sterndrive types appears below field 106 for user selection in a conventional manner, as shown in FIG. 16. Once the computer user has made a selection from the list 108, the field 106 is populated with the selection, as shown in FIG. 17. The computer user is then guided to identify a horsepower and engine size (liter) using menu 110. Menu 110 is not enabled until the computer user has made a selection of the sterndrive type. Menu 110 includes a field 112 that is populated by a user selection from a list 114, FIG. 18, which is displayed with user selection of drop down arrow 116. After the user has chosen a horsepower and liter from the list 114, the user is then guided to identify a sterndrive model using menu 118 and then a model year using menu 120. Having completed the first phase of the process, the computer user then proceeds with selecting options for the replacement propeller during the second phase of the process, as described previously herein.

As described above, the first set of menus are initially enabled in a specified order to identify the engine or sterndrive manufacturer. However, once a particular menu is enabled, a computer user can change a previous selection for the menu by selecting the drop down arrow for the menu, viewing the list that appears, and making a new selection. The second set of menus are configured somewhat differently in that all of the second set of menus are enabled when the first phase of the process is completed. Thus, the user can make a selection for a replacement part option, e.g., material type, number of blades, and direction of rotation, in any order the computer user chooses. It is understood however that the second set of menus could be configured to be sequentially enabled similar to the first set of menus.

As described above, the present invention provides a system by which video content is played automatically in a video portion of a GUI to assist a computer user in completing various field (menus) contained on the GUI. In one preferred embodiment, the system assists the computer user in determining a replacement propeller for a watercraft based on user inputs identifying the OEM engine or sterndrive. With reference to FIG. 19, the system carries out a two phase process for assisting the user in determining the replacement propeller.

The process 122 begins at block 124 with the system loading the GUI 30 when the remote computer user enters an Internet address corresponding to the website onto which the GUI 30 is loaded. When the GUI is loaded, the system automatically calls a video file from the video database and loads the video file so that the video content begins to play automatically in the video portion of the GUI 30 at block 126. As described above, the interactive tool 28 is designed to guide the computer user in identifying the OEM engine and/or sterndrive. As such, in a first instance, the system receives and identifies an engine/sterndrive manufacturer at block 128, the engine or sterndrive horsepower at block 130, the engine model at block 132, and the model year (or range of years) at block 134. From these inputs the system determines a list of replacement propellers at block 136 but before conveying that list to the computer user, the user is prompted during the second phase of the process to identify desired options for the replacement propeller.

The second phase of the process 122 is designed to guide the user in identifying desired options for the replacement propeller. In this regard, when the first phase of the process 122 is complete, i.e., menu 44 has been completed, the second set of menus 46, 48, 50 are enabled and a new video is loaded and automatically plays in the video portion 36 of the GUI 30 at block 138. The content of this video is to guide the computer user in completing the second set of menus. Similar to the video played during the first phase of the process, the video plays automatically when loaded therefore the computer user does not need to select a link to the video or load a separate software application to play the video.

The process 122 thus continues on with prompting the computer user to identify a desired material for the replacement propeller at block 140, a number of blades at block 142, and a direction of propeller rotation at block 144. From this information, the system determines one or more replacement propellers that satisfy the user desires at block 146 and displays the list on the computer user's display unit at block 148.

In an alternate embodiment, the tool 28 may also allow the computer user to indicate whether the computer user needs help finding the expert pitch. In this embodiment, if the computer user needs help, additional menus are presented to the computer user to guide the computer user in delivering the pitch. It is contemplated that a new video could be played in the video portion automatically to help guide the computer user in completing the additional menus.

The present invention has been described with respect to an online tool that assists a remote computer user in determining a replacement propeller for an OEM propeller by identifying certain parameters of the watercraft's engine or sterndrive. In addition to providing a set of menus to which the computer user is prompted to complete, the invention also provides a video that is played automatically and includes video content for assisting the computer user in completing the set of menus. The video plays in a dedicated video portion of the online tool and therefore does not require the computer user to select a link to the video or launch a separate media playing application. The video plays without interruption as the computer completes the menus.

It will be appreciated that the present invention may also be used in other applications where it is desirable to provide multimedia content directly within an online tool or GUI that includes various menus that the user is prompted to complete.

Various alternatives and embodiments are contemplated as being within the scope of the following claims particularly pointing out and distinctly claiming the subject matter regarded as the invention.

The invention claimed is:

1. A computer-implemented process for guiding a consumer in selecting a replacement part for an OEM part, the computer-implemented process comprising:
   causing a graphical user interface (GUI) to be displayed on a remote display unit, the GUI including a video display portion and first and second menu portions, wherein in response to the display of the GUI on the remote display unit:
   the first menu portion is configured to allow a user to select values for one or more properties associated with the OEM product and the second menu portion is configured to allow the user to select options for the replacement part for the OEM product;
   the second menu portion is disabled;

first data is transmitted to the remote display unit, the transmitted first data including first video content; and automatically playing the first video content on the GUI in the video display portion without a user input request to play the first video content, wherein the first video content includes media for guiding a user in completing the first menu portion;

detecting user completion of the first menu portion and then automatically enabling access to the second menu portion; and transmitting second data to the remote display unit in response to user completion of the first menu portion, the transmitted second data including second video content that is automatically played on the GUI in the video display portion without a user input request to play the second video content and that includes media for guiding the user in completing the second menu portion.

2. The process of claim 1 wherein the media for guiding the user in completing the second menu portion includes video and audio.

3. The process of claim 1 further comprising displaying a first set of drop down menus in the first menu portion of the GUI, wherein the first set of drop down menus includes a first drop down menu and at least a second drop down menu, and further comprising initially disabling the at least second drop down menu until the user has entered a value for the first drop down menu.

4. The process of claim 1 further comprising displaying a second set of drop down menus in the second menu portion automatically upon user completion of the first menu portion, wherein the second set of drop down menus include a first drop down menu and at least a second drop down menu, and further comprising initially disabling the at least a second drop down menu until the user has entered a value for the first drop down menu.

5. The process of claim 1 wherein the media includes audio and video for guiding the user in completing the first menu portion.

6. The process of claim 1 wherein the GUI includes playback control features to enable the user to control playing of the video content.

7. A computer implemented system for guiding user selection of a replacement part for an OEM part, the system comprising:

a database containing a listing of replacement parts;

memory storing a first video file and a second video file, the first video file containing video content for guiding user identification of a machine having an OEM part a user desires to replace and the second video file containing video content for guiding user selection of a replacement part for the OEM part; and a computer communicatively linked with a remote display unit and instructed by computer executable code to display a graphical user interface (GUI) on the display unit, the GUI having a first set of menus and a second set of menus, and wherein the computer is further caused to selectively enable in a prearranged order the first set of menus and play the video content of the first video file on the GUI upon display of the first set of menus on the GUI in response to the display of the GUI and without a user input request to play the video content of the first video file and wherein the computer is further caused to enable the second set of menus to facilitate user interaction therewith upon user completion of the first set of menus and automatically play the video content of the second video file on the GUI upon user completion of the first set of menus and without a user input request to play the video content of the second video file, the video content guiding user selection of the replacement part from the second set of menus.

8. The system of claim 7 wherein the computer is further caused to identify an OEM identifier from user inputs to the first set of menus and determine a replacement part associated with the identified OEM identifier and wherein the computer is further caused to populate the second set of menus with options available for the replacement part and from user inputs to the second set of menus, determine and display part identification information for the replacement part having the options corresponding to the user inputs to the second set of menus.

9. A computer implemented system for guiding user selection of an after-market propeller for a watercraft, the system comprising:

a database containing a listing of watercraft engine manufactures, power output options for engines manufactured by the watercraft engine manufactures, engine models for the watercraft engine manufactures, and model years for engines manufactured by the watercraft engine manufactures;

memory storing a first video file and a second video file, the first video file containing video content for guiding user identification of a watercraft engine and the second video file containing video content for guiding user selection of a replacement propeller for use with the watercraft engine; and a computer communicatively linked with a remote display unit and instructed by computer executable code to display a graphical user interface (GUI) on the display unit, the GUI having a video portion and a menu portion, wherein the computer is caused to display a first set of menus in the menu portion prompting a user to make inputs on the GUI to enter a watercraft engine manufacture, a power output for the watercraft engine, an engine model of the watercraft engine, and a model year for the watercraft engine and is further caused to simultaneously play the first video file in the video portion to guide user completion of the first set of menus during display of the first set of menus in the menu portion in response to the display of the GUI and without the user requesting the playing of the first video, and wherein the computer is further caused to determine a replacement propeller for use with the watercraft engine from the user inputs to the first set of menus and display a second set of menus in the menu portion prompting the user to make inputs on the GUI to select desired options for the replacement propeller, and wherein the computer is further caused to simultaneously play the second video file in the video portion to guide user completion of the second set of menus without a user input request to play the second video file.

10. The system of claim 9 wherein the computer is caused to disable the second set of menus until user completion of the first set of menus.

11. The system of claim 10 wherein the first set of menus includes a first menu for identifying a watercraft engine manufacture, a second menu for selecting a horsepower for the watercraft engine, a third menu for selecting an engine model, and a fourth menu for selecting a model year for the watercraft engine, and wherein the computer is further caused to display a list of watercraft engine manufactures upon a user input to the first menu, populate the second menu with horsepower values corresponding to engines manufactured by the watercraft engine manufactured selected by a user input to the first menu, populate the third menu with engine model names for engines manufactured by the user-selected watercraft engine manufacturer and having the horsepower selected by the user input to the second menu, and populate a fourth menu containing a list of engine model years for engines manufactured by the user-selected watercraft engine manufacture and having the user-selected horsepower, and corresponding to the engine model input to the third menu.

12. The system of claim 11 wherein the second set of menus includes a fourth menu for selecting a material for the replacement propeller, a fifth menu for selecting a number of blades desired for the replacement propeller, and a sixth menu for selecting direction of rotation for the replacement propeller, and wherein the computer is further caused to display a list of available material options for the replacement propeller from the user input to the fourth menu, display a number of blade options in the fifth menu for the replacement propeller of the material selected in the fourth menu, and prompt the user to select a rotation direction in the sixth menu.

13. The system of claim 12 wherein the computer is further caused to display a list of replacement propellers on the display unit that are matched to the user inputs to the first, second, third, fourth, fifth, and sixth menus.

* * * * *